Feb. 16, 1926.

C. A. FRANKLIN

GASKET HOLDER

Filed Feb. 7, 1925

1,573,484

Inventor
C. A. Franklin

By Clarence A. O'Brien
Attorney

Patented Feb. 16, 1926.

1,573,484

UNITED STATES PATENT OFFICE.

CLAUD A. FRANKLIN, OF KANSAS CITY, KANSAS.

GASKET HOLDER.

Application filed February 7, 1925. Serial No. 7,643.

*To all whom it may concern:*

Be it known that I, CLAUD A. FRANKLIN, a citizen of the United States, residing at Kansas City, in the county of Wyandotte and State of Kansas, have invented certain new and useful Improvements in a Gasket Holder, of which the following is a specification.

This invention relates to a device for holding gaskets which are particularly used in connection with cream separators.

One of the important objects of the present invention is to provide a gasket holder whereby the gasket may be suspended from a suitable hook or the like when not in use, and the rubber gasket will be prevented from stretching. Ordinarily after a gasket has been removed from a cream separator, the gasket is washed and then hung up until it is again necessary to use the same. Oftentimes, the gasket will become stretched and as a result when the same is placed on a cream separator again, there will be a possibility of the contents of the separator leaking due to the stretched condition of the gasket.

One of the objects of the invention is to provide a holder for the gasket when not in use so that the above disadvantages will be overcome and enabling the gasket to maintain its original shape so that it may properly fit on the cream separator for the designated purposes.

A still further object is to provide a gasket holder of the above mentioned character, which is of such construction as to permit a rubber gasket to be readily inserted or removed therefrom, the holder being further simple in construction, inexpensive, strong and durable, and further well adapted for the purposes for which it is designated.

Other objects and advantages of this invention will become apparent during the course of the following description.

Figure 1:
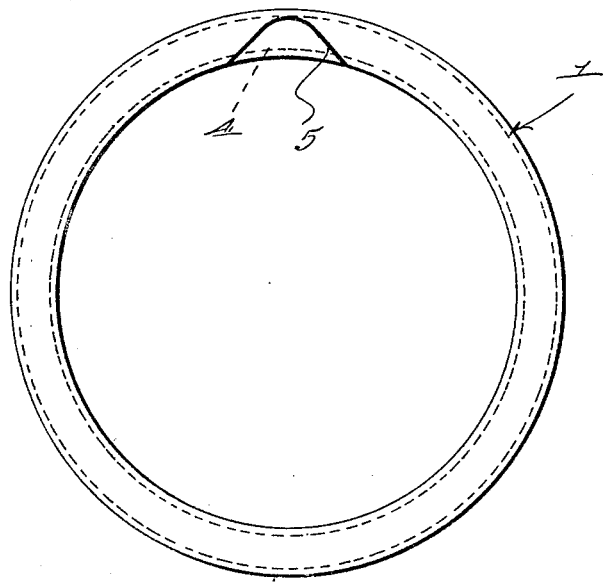
Figure 2:
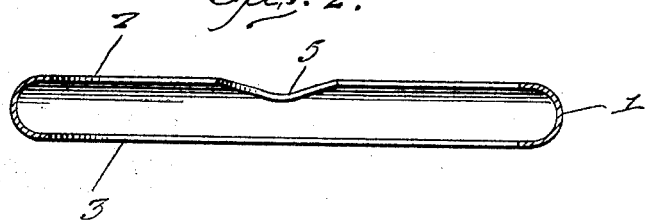

In the accompanying drawing forming a part of this specification, and in which like numerals designate like parts throughout the same:

Figure 1 is a top plan view of the holder embodying my invention showing a gasket positioned therein, and Figure 2 is a cross sectional view through the holder per se.

In the drawing wherein for the purpose of illustration is shown the preferred embodiment of my invention, the numeral 1 designates generally my improved gasket holder, the same being in the form of a ring, the respective edges thereof being disposed inwardly as illustrated at 2 and 3, whereby the ring or annulus is internally channeled. The ring is of such diameter as to receive and hold a rubber gasket 4 such as is used in connection with cream separators. The edge 2 of the ring is provided with an enlarged notch or cut out portion 5 to facilitate the insertion and removal of the gasket from the internally channeled ring as is obvious from the construction illustrated in the drawing.

The holder is preferably formed of aluminum, although any other suitable material may be substituted therefor, and I do not wish to limit myself to the particular kind of material which may be used.

After the gasket has been used on a cream separator and is removed therefrom and washed, the same is placed within the holder so that the gasket will be entirely confined therein as is illustrated in Figure 1. The holder with the gasket therein may then be placed over a suitable hook so that the inner peripheral edges of the holder will engage the supporting hook and prevent the gasket from touching the same, thus preventing any possibility of the gasket becoming stretched and of no further use.

While I have shown the preferred embodiment of my invention, it is to be understood that various changes in the size, shape and arrangement of parts may be resorted to without departing from the spirit of the invention and the scope of the appended claim.

Having thus described the invention, what I claim as new is:—

A gasket holder for the gasket used on cream separators, comprising a ring, the respective edges thereof being disposed inwardly to provide a channel which is substantially U-shaped in cross section and is adapted to receive the gasket, the inner diameter of the ring being less than the inner diameter of the gasket, one of the inwardly disposed edges of the ring being provided with a notch to facilitate the easy removal of the gasket from the ring.

In testimony whereof I affix my signature.

CLAUD A. FRANKLIN.